US011055093B1

(12) United States Patent
Draude et al.

(10) Patent No.: US 11,055,093 B1
(45) Date of Patent: Jul. 6, 2021

(54) METHODS AND SYSTEMS FOR AUTOMATED, INTELLIGENT APPLICATION DEVELOPMENT BY SCANNING METADATA BY A PLUG-IN TO MAKE RECOMMENDATIONS

(71) Applicant: salesforce.com, inc., San Francisco, CA (US)

(72) Inventors: Jeremy Hay Draude, Toronto (CA); Stuart Bernstein, Atlanta, GA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/725,786

(22) Filed: Dec. 23, 2019

(51) Int. Cl.
*G06F 8/77* (2018.01)
*G06F 9/445* (2018.01)
*G06F 8/71* (2018.01)
*G06F 8/75* (2018.01)

(52) U.S. Cl.
CPC .................. *G06F 8/77* (2013.01); *G06F 8/71* (2013.01); *G06F 8/75* (2013.01); *G06F 9/44526* (2013.01)

(58) Field of Classification Search
USPC .......................................................... 717/120
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |

(Continued)

OTHER PUBLICATIONS

Barker et al., Metadata for Learning Materials . . . , 2010, Technology, p. 225-243. (Year: 2010).*

*Primary Examiner* — John Q Chavis
(74) *Attorney, Agent, or Firm* — LKGlobal | Lorenz & Kopf, LLP

(57) ABSTRACT

Methods and systems to provide enablement information by implementing a plug-in application by: executing the plug-in application in a course of application development of the software package connected to a cloud-based computing system; parsing a set of applications contained in the software package to generate a set of metadata data that includes an entire set of metadata for the software package; receiving a set of rules via the cloud-based computing system; defining a set of definitions for each rule in the set of rules to enable a comparison of each rule to the set of metadata to extract one or more features of each application contained in the software package; generating an inventory set of one or more features based on rule definitions for the software package; and generating a recommendation related to a feature of the inventory set of features in each application of the software package.

20 Claims, 10 Drawing Sheets

(56) References Cited

U.S. PATENT DOCUMENTS

| | | | |
|---|---|---|---|
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,062,502 | B1 | 6/2006 | Kesler |
| 7,069,231 | B1 | 6/2006 | Cinarkaya et al. |
| 7,181,758 | B1 | 2/2007 | Chan |
| 7,289,976 | B2 | 10/2007 | Kihneman et al. |
| 7,340,411 | B2 | 3/2008 | Cook |
| 7,356,482 | B2 | 4/2008 | Frankland et al. |
| 7,401,094 | B1 | 7/2008 | Kesler |
| 7,412,455 | B2 | 8/2008 | Dillon |
| 7,508,789 | B2 | 3/2009 | Chan |
| 7,620,655 | B2 | 11/2009 | Larsson et al. |
| 7,698,160 | B2 | 4/2010 | Beaven et al. |
| 7,730,478 | B2 | 6/2010 | Weissman |
| 7,779,475 | B2 | 8/2010 | Jakobson et al. |
| 8,014,943 | B2 | 9/2011 | Jakobson |
| 8,015,495 | B2 | 9/2011 | Achacoso et al. |
| 8,032,297 | B2 | 10/2011 | Jakobson |
| 8,082,301 | B2 | 12/2011 | Ahlgren et al. |
| 8,095,413 | B1 | 1/2012 | Beaven |
| 8,095,594 | B2 | 1/2012 | Beaven et al. |
| 8,209,308 | B2 | 6/2012 | Rueben et al. |
| 3,275,836 | A1 | 9/2012 | Beaven et al. |
| 8,457,545 | B2 | 6/2013 | Chan |
| 8,484,111 | B2 | 7/2013 | Frankland et al. |
| 8,490,025 | B2 | 7/2013 | Jakobson et al. |
| 8,504,945 | B2 | 8/2013 | Jakobson et al. |
| 8,510,045 | B2 | 8/2013 | Rueben et al. |
| 8,510,664 | B2 | 8/2013 | Rueben et al. |
| 8,566,301 | B2 | 10/2013 | Rueben et al. |
| 8,646,103 | B2 | 2/2014 | Jakobson et al. |
| 8,813,065 | B2 * | 8/2014 | Zygmuntowicz ... G06F 9/45558 717/174 |
| 9,009,697 | B2 * | 4/2015 | Breiter .................. G06F 9/5072 717/171 |
| 2001/0044791 | A1 | 11/2001 | Richter et al. |
| 2002/0072951 | A1 | 6/2002 | Lee et al. |
| 2002/0082892 | A1 | 6/2002 | Raffel |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0162090 | A1 | 10/2002 | Parnell et al. |
| 2002/0165742 | A1 | 11/2002 | Robins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio et al. |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2006/0021019 | A1 | 1/2006 | Hinton et al. |
| 2008/0249972 | A1 | 10/2008 | Dillon |
| 2009/0063414 | A1 | 3/2009 | White et al. |
| 2009/0100342 | A1 | 4/2009 | Jakobson |
| 2009/0177744 | A1 | 7/2009 | Marlow et al. |
| 2010/0088150 | A1 * | 4/2010 | Mazhar ............... H04L 41/0806 717/120 |
| 2011/0247051 | A1 | 10/2011 | Bulumulla et al. |
| 2012/0042218 | A1 | 2/2012 | Cinarkaya et al. |
| 2012/0218958 | A1 | 8/2012 | Rangaiah |
| 2012/0233137 | A1 | 9/2012 | Jakobson et al. |
| 2013/0212497 | A1 | 8/2013 | Zelenko et al. |
| 2013/0218948 | A1 | 8/2013 | Jakobson |
| 2013/0218949 | A1 | 8/2013 | Jakobson |
| 2013/0218966 | A1 | 8/2013 | Jakobson |
| 2013/0247216 | A1 | 9/2013 | Cinarkaya et al. |

* cited by examiner

400

405

420

=== Inventory of Package:

410

| METADATA TYPE | COUNT |
|---|---|
| Permission Sets | 1 |
| Custom Metadata | 0 |
| Feature Parameters (Boolean) | 0 |
| Feature Parameters (Date) | 0 |
| Feature Parameters (Integer) | 0 |
| Custom Settings | 0 |
| Custom Labels | 0 |
| Tabs | 5 |
| Flows | 1 |
| Screen Flows | 1 |
| Autolaunched Flows | 0 |
| Process Builder | 0 |
| Flow Templates | 0 |
| Screen Flow Templates | 0 |
| Autolaunched Flow Templates | 0 |
| Apex Classes | 6 |
| With Future Methods | 2 |
| With Aura Enabled Methods | 4 |
| With Invocable Methods or Variables | 0 |
| Batch Apex | 1 |
| Apex BEST | 0 |

Sample Output Report

505

ISV Technical Enablement:

Flows With Template: 510

For more information about Flow Templates – https: *//partners.salesforce.com/0693A0008*

Batch Apex: 515

For more information on Batch Apex Design patterns – https: *//partners.salesforce.com/*

Triggers on Expense_Type__c: 520

Best Practices Recommend 1 trigger per object. For more information on Trigger Best Async Triggers: 530

For more information on Async Triggers – https: *//developer.salesforce.com/blogs/2019*

In-App Prompts: 540

For more information – https: *//medium.com/inside-the-salesforce-ecosystem/in-app-pro*

Fields on Activity: 550

Please be aware that there is a hard limit of 100 fields on Activity including manage Aura Web Components: 560

For a decision matrix on whether you should be considering migrating to LWC – https:

Installation Warnings: 570

Package cannot be installed in Essentials, due to:

-Apex count is greater than 0. Package cannot be installed without Security Review -Custom Objects count is greater than 0. Package cannot be installed without Security

Enablement Messages

| | | A | B | C | D | E | F | G |
|---|---|---|---|---|---|---|---|---|
| 610 | 1 | Metadata Type | Condition | Enablement Message | Status | Notes | | |
| 620 | 2 | Flows w/o Template | Not Found | For more information about Flows - https: //partners. salesforce.com/ 0693A00000752Dq | Complete | | | |
| 630 | 3 | Flow Templates | Not Found | For more information about Flow Templates - https: //partners. salesforce.com/ 0693A00000752Dq | Complete | | | |
| 640 | 4 | Classes | NA | | | | | |
| 650 | 5 | Batch Apex | Found | For more information on Batch Apex Design patterns - https:// partners.salesforce. com/0693A000006aF9G | Complete | | | |
| 660 | 6 | Triggers | NA | Best Practices Recommend 1 trigger per object. For more information on Trigger Best Practices, see this webinar -https://developer.salesforce. com/events/webinars/Deep_ Dive_Apex_Triggers | Complete | | | |
| 670 | 7 | Async Triggers | | For more information on Async Triggers - https://developer.salesforce. com/blogs/2019/06/get- buildspiration-with- asynchronous-apex-triggers- in-summer-19.html | Complete | | | |
| 680 | 8 | Visual Force Pages | NA | For more information about | | | | |

Installation Warnings

710

720

| | A | B | C | D | E | F | G | H |
|---|---|---|---|---|---|---|---|---|
| 1 | | Essentials | Group | Professional | Enterprise | | | |
| 2 | Record Types | No | No | | | | | |
| 3 | Person Accounts | No | No | | | | | |
| 4 | Apex Web Services | No | No | No | | | | |
| 5 | Custom Profiles | No | No | | | | | |
| 6 | Custom Fields on Activity | 100 | 100 | 100 | 100 | | | |
| 7 | Report Types | No | No | 50 | 100 | | | |
| 8 | | | | | | | | |
| 9 | | | | | | | | |
| 10 | | | | | | | | |

Edition Warnings 810

| EDITION | ITEM 815 | THRESHOLD 820 |
|---|---|---|
| Essentials 825 | Record Types | 0 |
| | Person Accounts | 0 |
| | Classes with Invocable Apex | 0 |
| | Platform Events | 0 |
| | Custom Profiles | 0 |
| | Sharing Rules | 0 |
| | Custom Fields on Activity | 100 |
| | Custom Metadata | |
| | Apex | 0 |
| | Scheduled Apex | 0 |
| | Custom Objects | 0 |
| Group Edition 830 | Record Types | 0 |
| | Person Accounts | 0 |
| | Report Types | 0 |
| | Classes with SOAP Apex Web Services | 0 |
| | Custom Profiles | 0 |
| | Sharing Rules | 0 |
| | Custom Fields on Activity | 100 |
| Professional Edition 840 | Classes with SOAP Apex Web Services | 0 |
| | Report Types | 50 |
| | Custom Fields on Activity | 100 |
| Enterprise Edition 850 | Custom Fields on Activity | 100 |
| | Report Types | 100 |

Rules Dump sfdx isvte:listrules

Enablement Rules 910

920

| RULE | THRESHOLD (930) | MESSAGE (940) |
|---|---|---|
| Custom Metadata | >0 | Be aware of the following Alert for Ne |
| Custom Settings | >0 | Be aware of the Alert for New Permissi |
| Flows | <0 | For more information about Flows - htt |
| Flows With Template | <0 | For more information about Flow Templa |
| Batch Apex | >0 | For more information on Batch Apex Des |
| Any Trigger | >1 | Best Practices Recommend 1 trigger per |
| Async Triggers | >-1 | For more information on Async Triggers |
| In-App Prompts | <0 | For more information - https: *//medium.* |
| Fields on Activity | >0 | Please be aware that there is a hard 1 |
| Platform Events | >0 | For more information of Platform Event |
| Change Data Capture | >0 | For more information on Change Data Ca |
| Aura Web Components | >0 | For a decision matrix on whether you s |
| Lightning Web Components | <0 | Find more information about the power |
| Einstein Analytics Template Bundles | >0 | For more information on Creating & Dis |

FIG. 9

METHODS AND SYSTEMS FOR AUTOMATED, INTELLIGENT APPLICATION DEVELOPMENT BY SCANNING METADATA BY A PLUG-IN TO MAKE RECOMMENDATIONS

TECHNICAL FIELD

Embodiments of the subject matter described herein relate to application development in cloud-based computing. More particularly, embodiments of the subject matter relate to methods and systems for Application development in which a DX plug-in is implemented to scan metadata for comparisons against formatted packages to make recommendations.

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. “Cloud computing” services provide shared resources, software, and information to computers and other devices upon request. In cloud computing environments, the software can be accessible over the Internet rather than installed locally on in-house computer systems. This “cloud” computing model allows applications to be provided over a platform “as a service” supplied by the infrastructure provider.

The infrastructure provider typically abstracts the underlying hardware and other resources used to deliver a customer-developed application so that the customer no longer needs to operate and support dedicated server hardware. Cloud computing typically involves over-the-Internet provision of dynamically scalable and often virtualized resources. Technological details can be abstracted from the users, who no longer have the need for expertise in, or control over, the technology infrastructure “in the cloud” that supports them. The cloud computing model can often provide substantial cost savings to the customer over the life of the application because the customer no longer needs to provide dedicated network infrastructure, electrical and temperature controls, physical security and other logistics in support of dedicated server hardware.

In many cases developers fail to understand what resources are available and can be used in the application with a cloud-connected platform. For example, while developers can go to great lengths to provide efficient functions and components for a package based on present requirements, the developers often are not given any guidance on how similar or comparative packages on the platform have been implemented, and further what other resources on the platform may avail themselves for use for best practices. In order to build more useful applications, developer’s tools must be implemented that provide comparisons of applications developed on the platform to the developers. When this is not feasible they must rely on other methods for application development or seek the recommendations of consulting partners.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 4 is an output information table of an exemplary sample report of an inventory of package based on the metadata executed by the DX plug-in in the disclosed embodiments that can be implemented in accordance with the disclosed embodiments;

FIG. 5 is an output information table of an exemplary sample report of recommendations and best practices for the package based on the metadata executed by the DX plug-in in the disclosed embodiments that can be implemented in accordance with the disclosed embodiments;

FIG. 6 is an output information table of an exemplary sample report of enablement conditions for the package based on the metadata executed by the DX plug-in in the disclosed embodiments that can be implemented in accordance with the disclosed embodiments;

FIG. 7 is an output information table of an exemplary sample report of installation warnings for the package based on the metadata executed by the DX plug-in in the disclosed embodiments that can be implemented in accordance with the disclosed embodiments;

FIG. 8 is an output information list of an exemplary sample report of edition warnings for the package based on the metadata executed by the DX plug-in in the disclosed embodiments that can be implemented in accordance with the disclosed embodiments;

FIG. 9 is an output information list of an exemplary sample report of enablement rules 910 for the package based on the metadata executed by the DX plug-in in the disclosed embodiments that can be implemented in accordance with the disclosed embodiments.

DETAILED DESCRIPTION

Figure 1:
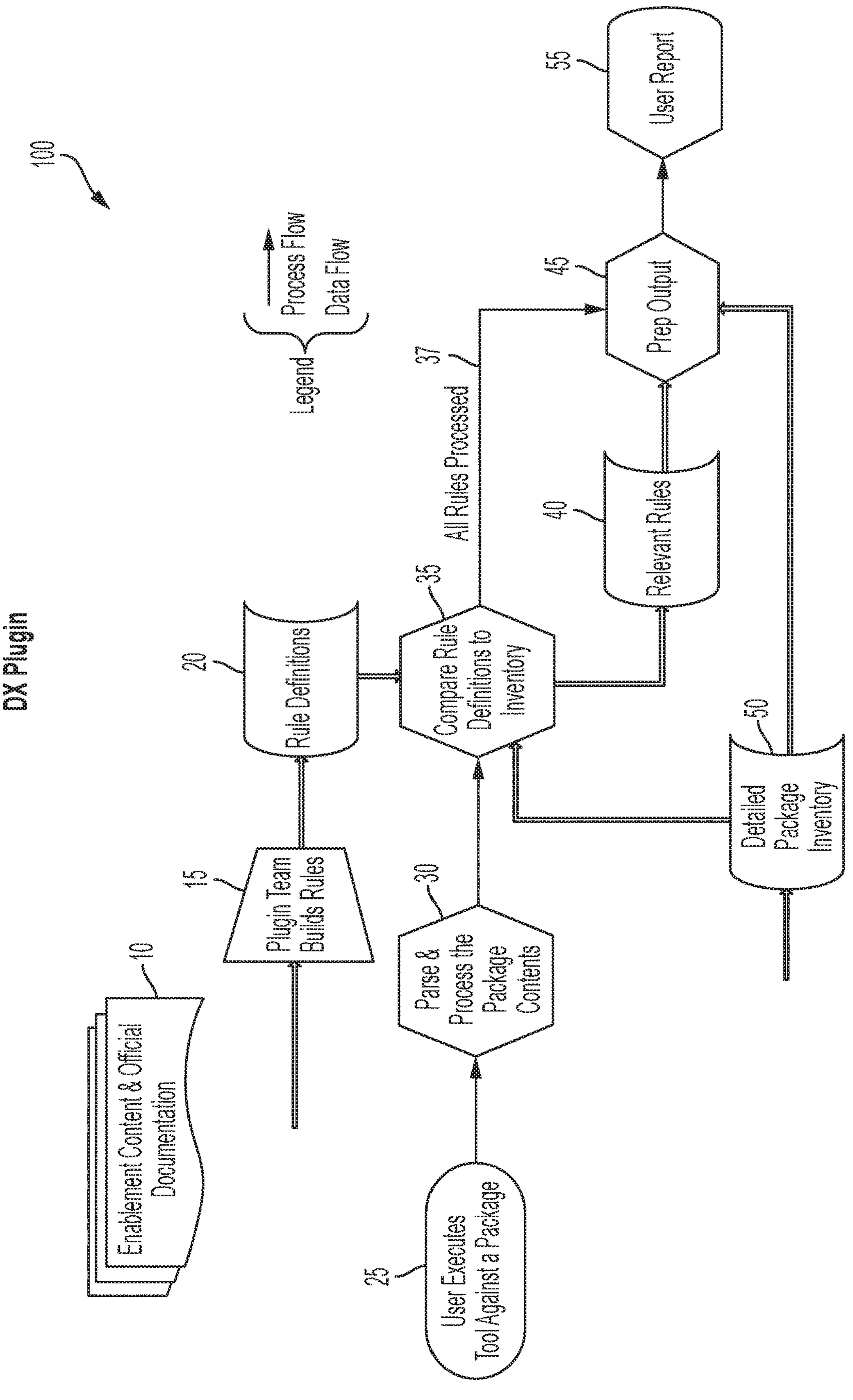
FIG. 1 is a schematic block diagram of an example of a DX plug-in application execution against a package in development on a platform, in accordance with the disclosed embodiments.

In life cycle development of application configured in packages, developers may not always be knowledgeable about all the features or newly added features that are available on a platform that will improve their application performance. In order to get a more accurate picture features, and how user can interact with the packages, proven strategies and best practices must be relied upon. Application developers create the packages based on prior experience, input they receive from other developers and users, and often as a result of this piecemeal approach to development insights can have an incomplete picture of how a user interacts with the package, what other features or products can be implemented in the application and what additional steps should be taken to improve long term usability and maintainability by the user (i.e. the customer).

The development teams are not always aware of all the technical offerings a platform may provide in order to improve how users interact with applications. Hence, developers may make assumptions when it comes to creating applications and/or application packages, and sometimes these assumptions can be very inaccurate.

The multi-tenant cloud-based architectures have been developed to improve collaboration, integration, and community-based cooperation between customer tenants without compromising data security. Generally speaking, multi-tenancy refers to a system where a single hardware and software platform simultaneously supports multiple organizations or tenants from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture, therefore, allows convenient and cost-effective sharing of similar application feature software between multiple sets of users.

In general, businesses use a customer relationship management (CRM) system (also referred to as a database system or system) to manage business relationships and information associated with the business relationship. For example, a multi-tenant system may support an on-demand CRM application that manages the data for a particular organization's sales staff that is maintained by the multi-tenant system and facilitates collaboration among members of that organization's sales staff (e.g., account executives, sales representatives, and the like). This data may include customer and prospect contact information, accounts, leads, and opportunities in one central location. The information may be stored in a database as objects. For example, the CRM system may include "account" object, "contact" object and "opportunities" object.

Methods and systems are provided for intelligent application process development that can recommend how to modify applications and/or application packages based on implementing a monitoring and scanning tool via a DX plug-in for comparisons of metadata of the package in development with data of various parts of the package, application or data from a connected cloud platform. The methods and systems implemented by the DX plug-in can track actions in development, and use predictive analytics capabilities to provide a prescriptive solution on how to best design existing applications and packages. The metadata extracted can be interpreted and used to generate recommendations that are aligned to application feature enhancements and reconfigurations of the existing applications or packages in order to improve any interaction processes that may be unnecessary, disjointed, or inaccurate, and institute best practices in the development process. In other words, recommendations can be generated based on the system input received based on the monitored metadata of the package. The system scanning tool acts like an observer that catalogs the meta-data points and provides recommended solutions based on the capabilities of the system.

In an exemplary embodiment, the DX plug-in is enabled to assist to determine industry cloud compatibility or an organization's edition software compatibly. As an example, the DX plug-in is enabled to provide a user-friendly content of a FORCE.COM® (i.e. SALESFORCE.COM® platform) application based on the metadata and recommended best practices by providing links to pertinent enablement tools (webinars, blogs, help texts) and disclosing installation limitations based on features on an organization software edition in use.

In an exemplary embodiment, the DX plug-in is enabled by a cloud platform of SALESFORCE® APPEXCHANGE® Partners and can be executed any time during the build or packaging process. As an example, the SALESFORCE® platform creates a lot of enablement content for ISVs and Developers to assist in advantage of tools and features. The DX plug-in is configured to inform the developer of appropriate links based on what's relevant to the package in development and prevent the developer from having to perform a step of manually having to find relevant documentation, best practices, and enablement content. This automated step and further convenience will allow ISV developers to build better and feature-rich applications using the appropriate technologies. For example, for the developer to consider using flow templates if none are found and recommend links to appropriate ISV created resources.

In various exemplary embodiments, the DX plug-in can provide warnings based on the features found in the organization editions cannot be installed in a professional, group or essentials edition which allows the developer to make decisions before packaging the organization's editions avoiding re-work and surprises later. The DX plug-in will also highlight whether the warning can be circumvented by security review. The DX plug-in will also help during employee turnover at the ISV to quickly allow those inheriting an application to understand what parts of the salesforce platform are viewed.

In addition, the DX plug-in is connected with a set of rules that are easily configurable/definable so the cloud platform product developers (i.e. SALESFORCE® platform internal product teams) can augment, change or remove rules, and configure rules to enable customers and partners to surface their own content to their respective development teams, technical personnel or to share it with a broader community of partners. Further, for this instance of the specific rules that are made are available, the DX plug-in can be enabled to perform automated checks and validations with other commercial cloud package features implemented to determine if the features which have been referenced can aid in determining industry or commercial sector cloud compatibility.

In various embodiments, the DX plug-in can be configured with quality rules such as recommending custom objects to have descriptions, multiple triggers per object, permission requirements, partner alerts and installation warnings.

In various alternate embodiments, the DX plug-in can be coupled with an AI engine and the AI engine can generate recommendations on how to improve applications that reside on and that are provided by a cloud computing platform. The AI engine can utilize metadata to improve platform adoption, development, and ease of use. Metadata can represent a structure of a container for data it will contain. Metadata could be, for example, a custom tab, object, flow, process, or any data structure that is using and/or storing data. Developers can interact with a metadata layer by creating custom tables, fields, flows, processes, etc. that will work in conjunction with their data. For example, an object in an instance is metadata it represents a table in its simplest forms. The object contains records associated with it that contain customer data. In some cases, a custom object can be created to store data and that object could exist with other custom objects within a custom application. Alternatively, metadata can be tables that used to provide data structures or a form that is created and populated with data.

The recommendation(s) provided can vary depending on the implementation. For example, in one embodiment, the recommendations provided can include suggested modifications to an existing process (in accordance with which the users interact with the application) to result in a modified process (in accordance with which potential users interact with the application) to improve or simplify the users interaction with the application (e.g., a new process to remove repetitive actions for end-users). For instance, as one non-limiting example, a recommendation could provide a suggestion on how to improve an end user's interaction with the system, such as creating a process flow to limit the amount of work a user needs to complete in order to submit a record. For example, "I see your users are only completing these fields on these records, would you like me to show you some process builder examples, that can speed up the data entry process for them?" In another embodiment, the recommendations provided by the system alert can include suggested modifications to an existing process workflow (in accordance with which the users interact with the application) to result in a modified process workflow (in accordance with which the users interact with the application) to reduce a number of steps required to perform or complete a task, a job or an action when the users interact with the application.

In various exemplary embodiments, the DX plug-in analyzes the entire metadata of an application and provides documentation and recommendations based on the entire superset of metadata found. The documentation and recommendations are targeted at ISV specific enablement content (e.g. Webinar on best practices for packaging Batch Apex).

In another embodiment, the DX plug-in can provide a recommendation on when new platform features or enablement content are released which are relevant to the package, the tool can push the fact of the feature as well as content to the developers and product managers to help them make use of it. For example release notes and documentation do not have to be sought out manually and discussions can be performed internally of all new features, not just those relevant to the application.

The present disclosure provides improvements over current linting (i.e. tools for checking code for errors) and security scanning tools which only scan code for errors, formatting and known vulnerabilities as the DX-plug-in solution looks at the entire application, not just the code and does not just look for errors (syntax, runtime, etc.) or security vulnerabilities. Further, rather than a piecemeal approach looking at each piece of apex code separately, the present disclose teaches reviewing the entire application in its entirety.

The DX plug-in can be enabled for tools that look similar but perform different functions. The recommendations provided can include a new process (in accordance with which the users interact with the application) to improve or simplify the user's interaction with the application (e.g., a new process to remove repetitive actions for end-users). As used herein, a process can include a series of actions or steps within the application. In another embodiment, the recommendations provided can include suggestion(s) for a new process flow in accordance with which the users interact with the application. As used herein, a process flow can refer to a series of declarative automation steps that includes configured logic and actions for a business process based on the input from users. In another embodiment, the recommendations provided by the DX plug-in alert can include a new process workflow (in accordance with which the users interact with the application) to perform or complete a task, a job or an action when the users interact with the application. As used herein, a process workflow can refer to a set of instructions using if/then statements within a container that can automate standard internal procedures and processes enabling users to save time. When a record meets certain criteria, the rule's actions found within a workflow can be executed.

FIG. 1 is a schematic block diagram of an example of a DX plug-in application execution against a package in development on a platform, in accordance with the disclosed embodiments. As shown in FIG. 1, an exemplary cloud-based solution may be implemented with the DX plug-in in the context of the development of an application on a connected cloud computing platform in the context of the DX plug-in method 100 including available documentation of enablement content and official documentation 10, plug-in team build rules 15, and rule definitions 20. When executing the tool (i.e. DX plug-in) against a package at step 25, initially the DX plug-in at step 30 will parse and process the package contents. Then, at step 35 will compare rules received via input from a module of configured or defined rules 20 to an inventory of features, parts, processes etc. of the package received from an input of a module configured with the detailed package inventory 50. The detail package inventory 50 is created from metadata extracted by the parsing and processing of the package contents performed by the DX plug-in at step 30. After the comparison of the configured rules to the inventory detailed of the package content, the process flow continues either at process flow 37 for processing all the rules, or to configuring a module of the relevant rules 40. In each case, the process flow continues to configuring a module for prepping the output 45. In addition, the detailed package inventory is received as an input to the prepping of the output 45. Once, the output is prepped, the user (i.e. developer) report is generated at step 55. This report may be generated periodically or preconfigured for creation during pre-selected stages in the application development cycle to aid the developer in feature configurations in the application development at appropriate or optimum stages.

Figure 2:
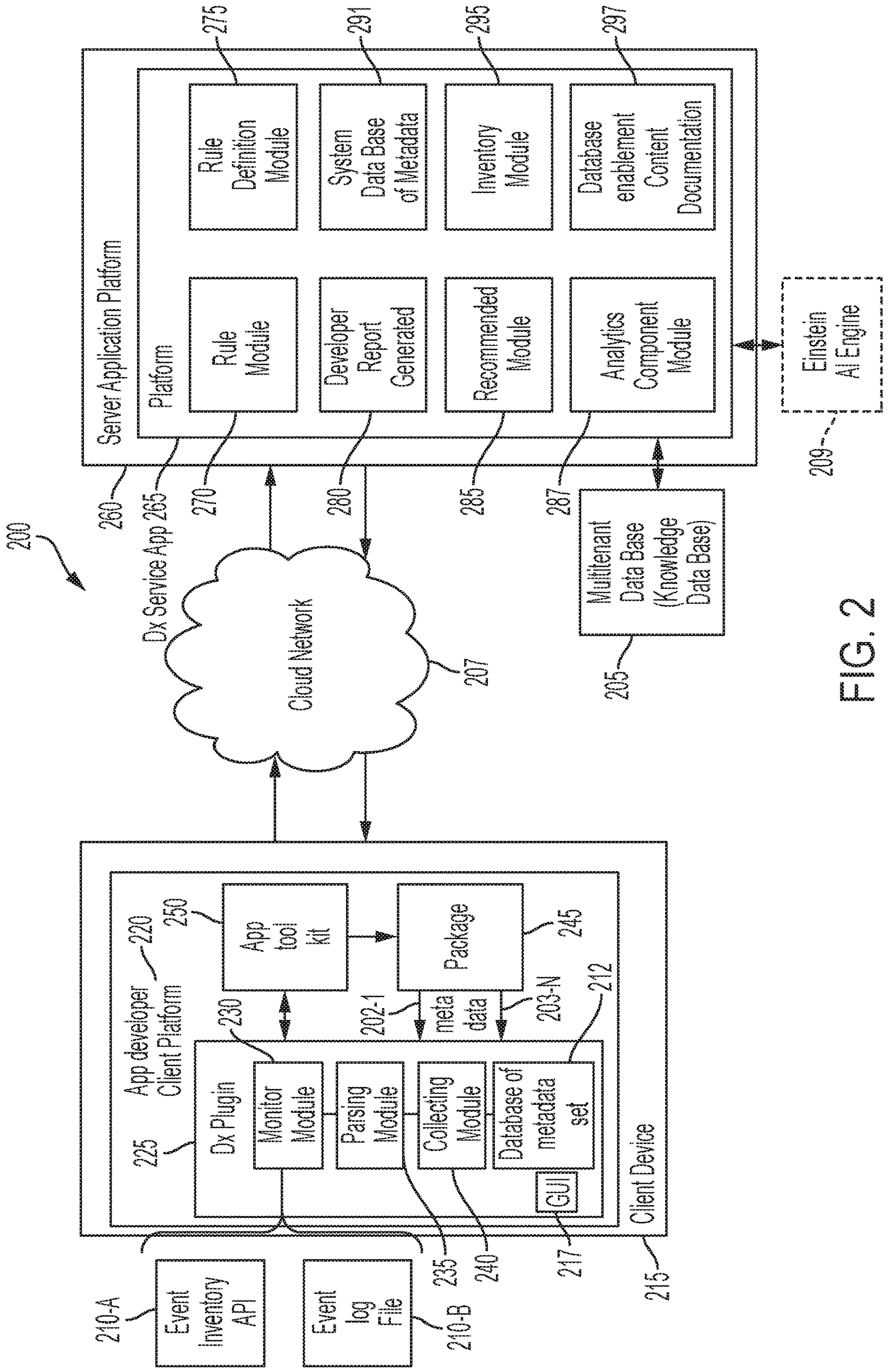
FIG. 2 is a block diagram of architecture to implement the DX plug-in in an automated intelligent application process of a cloud-based application system in accordance with the disclosed embodiments.

FIG. 2 is a block diagram of architecture to implement the DX plug-in in an automated intelligent application process of a cloud-based application system 200 in accordance with the disclosed embodiments. Although a single instance of the system 200 is shown in FIG. 2, it should be appreciated that a cloud-based computing system, such as a multi-tenant system 1000 of FIG. 10, can include at least one instance of the system 200 for each organization or tenant that is part of the cloud-based computing system. The system 200 includes a monitoring module 230 and graphic user interface 217 of the DX plug-in connected via a network cloud 207 to a server app platform 260 configured with a DX server app 265 for communicating with the DX plug-in 225. On the user side, the system 200 includes the DX plug-in 225 residing as an app or an in-app on a developer client platform 220. The DX plug-in includes a monitoring module 230 for monitoring event APIs 210-A and generating event log files 210-B. Additionally, a parsing module 235 for executing parsing operations and creating an inventory of features in use, to be used etc. The App developer client platform 220 is hosted on a client device 215 that communicates via a network cloud 207 to a server app platform 260 that provides an app platform and connections to a multi-tenant database 205, an AI engine 209 and app exchanges (not shown).

In various exemplary embodiments, the DX server app 265 can operate by implementing a set of rules (i.e. using rule-based modules 270) or can be implemented with an AI engine 209 for performing analytics of the meta-data. The DX Server app 265 includes a database with content documentation 297, and a database of metadata sets 290 related to features for use in matching operations for inventory management, and for configuring or recommending additional features for the package 245.

The monitoring module 230 monitors metadata sets 202-1 . . . 202-N generated by each user (i.e. developer) that interacts with the package 245 (i.e. application in development) to generate a set of metadata for each particular user. A metadata set can be considered a record that contains data about the inventory of the package 245 implemented. This data can provide a trail of user's real-time interaction or activity with an application. Stated differently, metadata can represent a path a user takes when interacting with an application (e.g., a set or series of actions taken by a user when interacting with the application). For example, this can include tracking data about which application features (e.g., fields, buttons, links, pages, etc.) a user interacts with and in what order. The set of metadata data 212 collectively indicate a path of action or interaction with features of the application by each particular user while they interact with the application.

In one embodiment, the metadata monitoring module 230 can include an event monitoring API 210-A for each organization. The event monitoring API 210-A monitors or tracks the various metadata 202-N (202-1 . . . N) and generates at least one event log file 210-B that stores or "logs" events from the various metadata 202-N. The events stored in the events log file(s) 210-B can represent and can be referred to as metadata data 202-N. For example, events can be data points collected by the system that indicates which features (e.g., fields, buttons, links, pages, etc.) the users interact with and in what order, and can collectively represent the features contained in the package 245 as well as usage patterns that reflect the developers interaction with the package 245 and a tool kit 250. As will be described below, the metadata data stored in the events log file(s) 210-B can then be utilized by other elements 240 (the collecting module), 235 (the parsing module) of the system 200 for various purposes as will be described below. Depending on the implementation, the events log file 210-B can be stored at the metadata monitoring module 230 or in external storage and is accessible by other entities including the analytics engine 287 which performs comparisons of meta-data sets. For example, the analytics engine 287 can extract sets of metadata for processing by rules of a rule-based module 270, for comparison with sets in a metadata database 290 to identify an inventory of features, programs, etc. implemented in the package 245. For example, usage patterns that include metadata that indicate which features (e.g., fields, buttons, links, pages, etc.) the users interact with and in what order can be identified as well as inventory of the features. The recommender module 285 can be configured to analyzes the entire metadata of an application and provides documentation and recommendations based on the entire superset of metadata found. The documentation and recommendations (from the database of content documentations 297) are targeted ISV specific enablement content (e.g. Webinar on best practices for packaging Batch Apex). The inventory module 295 can provide inventory of features; for example the inventory module 295 can include new platform features or enablement content released which are relevant to the package for access by the DX plug-in and alerts can be provided to the recommender module 285 about this feature. Additionally, the rule definition module 275 together with the rule-based module 270 can enable from input (via the GUI 217) from the developer, product teams etc. facts of features as well as content to the developers and product managers to help them make use of it.

In various exemplary embodiments, the DX plug-in can provide package and application security health checks. For example, the DX plug-in can analyze settings and makes suggestions to reduce security risk and is the health checks can be configured to be used by the administrative charged in a production organization. For example, the health checks can be implements by the DX plug-in for the developer to be used during the design/build phases (can be part of CI process) and before an application is packaged for release. The health checks can include to tracking the login history to protect from intrusions, put forth recommendations on how to restrict ex-employees from exporting data, and documentation of why setting up two-factor authentication or identity verification is crucial, and how to enable single sign-on for a secure and simple way to log in. Other recommendations can include security score for certain settings compared to a recommended baseline settings, allowing administrators to understand how robust their configuration is from a security standpoint. As an example, the security score includes: Minimum password length (SALESFORCE® recommends 8 characters), Maximum invalid login attempts (SALESFORCE® recommends, forced logout on session timeout (SALESFORCE® recommends enabling this), and forced re-login after an administrator logs in as another user (SALESFORCE® recommends enabling this).

The DX plug-in can be enabled for tools that look similar but perform different functions. The recommendations provided can include a new process (in accordance with which the users interact with the application) to improve or simplify the user's interaction with the application (e.g., a new process to remove repetitive actions for end-users). As used herein, a process can include a series of actions or steps within the application. In another embodiment, the recommendations provided can include suggestion(s) for a new process flow in accordance with which the users interact with the application. As used herein, a process flow can refer to a series of declarative automation steps that includes configured logic and actions for a business process based on the input from users. In another embodiment, the recommendations provided by the DX plug-in alert can include a new process workflow (in accordance with which the users interact with the application) to perform or complete a task, a job or an action when the users interact with the application. As used herein, a process workflow can refer to a set of instructions using if/then statements within a container that can automate standard internal procedures and processes enabling users to save time. When a record meets certain criteria, the rule's actions found within a workflow can be executed.

In another embodiment, the recommendations provided can include suggestions for modifications to the feature(s) of the application. For example, the suggestions for modifications to feature(s) of the application can includes suggestions for modifications can include recommendation(s) that suggest whether one or more input controls of the application are presented within the application, or an order in which input control(s) of the application are presented to the users of the application; recommendation(s) that suggest whether one or more navigational component(s) of the application are presented within the application, or an order in which navigational component(s) of the application are presented to the users of the application; recommendation(s) that suggest whether one or more informational component(s) of the application are presented within the application, or an order in which informational component(s) of the application are presented to the users of the application; recommendation(s) that suggest whether one or more container(s) of the application are presented within the application, or an order in which container(s) of the application are presented to the users of the application; recommendation(s) that suggest whether one or more page(s) of the application are presented within the application, or an order in which page(s) of the application are presented to the users of the application; recommendation(s) that suggest whether one or more field(s) of the application are presented within the application, or an order in which field(s) of the application are presented to the users of the application, etc.

In another embodiment, the recommendations provided can include suggestions for new feature(s) of the application (e.g., recommendation(s) that suggest one or more input controls for the application and/or an order in which input control(s) are presented to the users of the application; recommendation(s) that suggest one or more navigational component(s) for the application and/or an order in which navigational component(s) are presented to the users of the application; recommendation(s) that suggest one or more informational component(s) for the application and/or an order in which informational component(s) are presented to the users of the application; recommendation(s) that suggest one or more container(s) for the application and/or an order in which container(s) are presented to the users of the application; recommendation(s) that suggest one or more page(s) for the application and/or an order in which page(s) are presented to the users of the application; recommendation(s) that suggest one or more field(s) for the application and/or an order in which field(s) of the application is presented to the users of the application, etc.) In another embodiment, the recommendations can include any combination of the above.

As some non-limiting examples, the AI engine could use extracted usage patterns from the metadata to create a process, recommend a process template, or recommend creating a quick action on a record based on the click paths of the users. The AI engine can recommend simpler design patterns by looking at metadata and generating recommendations on how to improve overall processes whether it be by modifying an existing process or flow within the application, by creating a new process or flow within the application or separate from the application, by creating a new workflow or modifying an existing workflow to create a modified workflow, by modifying permissions or profiles, by creating a new set of permissions or profiles, by modifying existing platform features (e.g., objects, tabs, custom applications, custom workflows, lightning flows, validation rules, etc.), by creating new platform features (e.g., objects, tabs, custom applications, custom workflows, lightning flows, validation rules, etc.), by changing how data is funneled into a cloud computing platform, etc. The cloud computing platform allows a developer or system administrator to develop custom data models and applications for desktop and mobile environments. These recommendations can suggest the best way to modify existing applications on the platform, and thus guide administrators and developers to maximize the efficiency of their metadata designs. The AI engine can also track whether users are uploading data sets to the cloud computing platform, and if so, provide recommendations to developers to avoid the need for uploading data sets to the cloud computing platform. To explain further, most, if not all, major cloud computing platforms have some type of data transfer application that allows a user to manually upload data to the desired endpoint (platform). The process is time-consuming and prone to errors, that is why it is generally not recommended, but a lot of customers extract, transform, load (ETL) data if they are unfamiliar with how application programming interface (API) calls work. As one non-limiting example of an extract, transform load (ETL) process, a user might extract a data set from a SQL database in the form a CSV document, and then modify the data in the CSV document, then upload the data set to the platform via data loader or some other data transfer application. As such, the meta-data from, as an example, click paths users take throughout can guide development teams on how to improve their existing applications.

In various exemplary embodiments, the DX plug-in can provide package and application security health checks. For example, the DX plug-in can analyze settings and makes suggestions to reduce security risk and is the health checks can be configured to be used by the administrative charged in a production organization. For example, the health checks can be implements by the DX plug-in for the developer to be used during the design/build phases (can be part of CI process) and before an application is packaged for release. The health checks can include to tracking the login history to protect from intrusions, put forth recommendations on how to restrict ex-employees from exporting data, and documentation of why setting up two-factor authentication or identity verification is crucial, and how to enable single sign-on for a secure and simple way to log in. Other recommendations can include security score for certain settings compared to a recommended baseline settings, allowing administrators to understand how robust their configuration is from a security standpoint. As an example, the security score includes Minimum password length (SALESFORCE® recommends 8 characters), Maximum invalid login attempts (SALESFORCE® recommends, forced logout on session timeout (SALESFORCE® recommends enabling this), and forced re-login after an administrator logs in as another user (SALESFORCE® recommends enabling this).

As used herein, the terms "interaction" and/or "action" refer to logic that allows a user to perform a task or work. Each action serves a unique purpose and can have a corresponding user interface (UI) element (e.g., action button or link) that invokes that action. An action button is a user interface element or component that can be selected by a user when a user interacts with it (e.g., selects or otherwise activates it) to invoke, trigger or execute a specific action. Action buttons can be predefined and provided by the application provider or edited or uniquely created by an administrator of a tenant (or customer organization).

There are different types or categories of actions. Some examples of the different types or categories of actions can include: object-specific actions (OSAs) that are explicitly tied to an object and are created in the context of the object (e.g., OSAs operate within the context of an object); global actions that enable users to create object records and operate with user context, but operate without object context; standard actions defined by the application provider; custom actions that are defined by the application provider and can be edited by the tenant to customize them or that can be defined by the tenant; default actions; mobile smart actions;

custom actions that have functionality defined by a tenant to create unique actions that are specific to their business and that can be used to launch custom pages created by the tenant; and productivity actions defined by the application provider that can appear on a set of objects such as account, contact, event, lead, user, user profile, etc. For example, to illustrate one specific, non-limiting example of the difference between an OSA and global action, and OSA can use a current object/record as context, for example, to create a contact that is tied to an account being viewed. By contrast, global actions are performed without such context (e.g., creating a contact that is not associated with anything, posting a question to a message board, etc.). Neither type necessarily needs to result in the creation or modification of a record, such as actions that navigate to a web page.

In one embodiment, the sets of metadata data can then be processed at an analytics engine 287 (i.e. comparison module) to extract metadata sets (i.e. usage patterns) that indicate how users interact with different features of the application during usage of the application. The extracted usage patterns indicate which features (e.g., fields, buttons, links, pages, etc.) the users interact with, how often they interact with each feature and in what order they interact with those features.

In an exemplary embodiment, an artificial intelligence (AI) engine 209 can then generate, based on the extracted usage patterns, recommendations for modifying the application to better customize or tailor the application for more streamlined use by the users (e.g., simplicity, faster use, more efficient use, improved data accuracy, system hardening, increased system/application adoption, etc.) in view of the extracted usage patterns.

To generate recommendations for modifying the application, the AI engine 209 can use any number of artificial intelligence technologies. Artificial intelligence is an area of computer science emphasizes the creation of intelligent machines that work and react like humans. Some of the activities computers with artificial intelligence are designed for include learning. Examples of artificial intelligence algorithms include, but are not limited to, key learning, actor-critic methods, reinforce, deep deterministic policy gradient (DDPG), multi-agent deep deterministic policy gradient (MADDPG), etc. Machine learning refers to an artificial intelligence discipline geared toward the technological development of human knowledge. Machine learning facilitates a continuous advancement of computing through exposure to new scenarios, testing and adaptation while employing pattern and trend detection for improved decisions and subsequent, though not identical, situations. Machine learning (ML) algorithms and statistical models can be used by computer systems to effectively perform a specific task without using explicit instructions, relying on patterns and inference instead. Machine learning algorithms build a mathematical model based on sample data, known as "training data," in order to make predictions or decisions without being explicitly programmed to perform the task.

For example, supervised learning algorithms build a mathematical model of a set of data that contains both the inputs and the desired outputs. The data is known as training data and consists of a set of training examples. Each training example has one or more inputs and the desired output, also known as a supervisory signal. In the case of semi-supervised learning algorithms, some of the training examples are missing the desired output. In the mathematical model, each training example is represented by an array or vector, and the training data by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task.

To provide predictive recommendations based on data sets received from the cloud computing platform, many different types of machine learning algorithms or models can be used individually or in combination as an ensemble. Examples of machine learning algorithms or models that can be implemented at the machine learning model can include, but are not limited to: regression models such as linear regression, logistic regression, and K—means clustering; one or more decision tree models (e.g., a random forest model); one or more support vector machines; one or more artificial neural networks; one or more deep learning networks (e.g., at least one recurrent neural network); fuzzy logic-based models; genetic programming models; Bayesian networks or other Bayesian techniques, probabilistic machine learning models; Gaussian processing models; Hidden Markov models; and heuristically derived combinations of any of the above, etc.

Decision tree learning uses a decision tree as a predictive model to go from observations about an item (represented in the branches) to conclusions about the item's target value (represented in the leaves). Tree models where the target variable can take a discrete set of values are called classification trees; in these tree structures, leaves represent class labels and branches represent conjunctions of features that lead to those class labels. Decision trees where the target variable can take continuous values (typically real numbers) are called regression trees. In decision analysis, a decision tree can be used to visually and explicitly represent decisions and decision making.

In one embodiment, the AI engine 230 can use any number of predictive or probabilistic methodologies to generate recommender module 285 for modifying the application. Examples can include Bayesian networks are a general tool that can be used for a large number of problems: reasoning (using the Bayesian inference algorithm), learning (using the expectation-maximization algorithm), planning (using decision networks) and perception (using dynamic Bayesian networks).

In one implementation, the AI engine 209 can use a stochastic model based on input from the metadata sets to provide the events which then the AI engine 209 can record and analyze. The AI engine 209 can provide continual recommendations based on the outcomes of those metadata events to the recommender module 285. The AI engine 209 can continually learn based on how the instance's users interact across the platform. Based on the metadata recipes, recommendation solutions can be provided that point to another feature on the platform that may be underutilized or overlooked entirely by developers. When data points collected meet certain requirements that align to specific features on the system that may not be currently utilized, recommendation solutions can be provided that points to another feature on the platform that may be underutilized or overlooked entirely by developers. The system development team knows of all the features that exist on the system because they created the system. As such, application development is no longer reliant on the knowledge of the application developer who may not be familiar with the entirety of the system.

The recommender module 285 provided can vary depending on the implementation. For example, in one embodiment, the recommender module 285 provided can include suggested modifications to an existing process (in accordance with which the users interact with the application) to result in a modified process (in accordance with which the users interact with the application) to improve or simplify the users interaction with the application (e.g., a new process to remove repetitive actions for end-users). In another embodiment, the recommender module 285 provided by the system alert can include suggested modifications to an existing process workflow (in accordance with which the users interact with the application) to result in a modified process workflow (in accordance with which the users interact with the application) to reduce a number of steps required to perform or complete a task, a job or an action when the users interact with the application.

In another embodiment, the recommender module 285 provided can include a new process (in accordance with which the users interact with the application) to improve or simplify the user's interaction with the application (e.g., a new process to remove repetitive actions for end-users). In another embodiment, the recommender module 285 provided can include suggestion(s) for a new process flow in accordance with which the users interact with the application. In another embodiment, the recommender module 285 provided by the system alert can include a new process workflow (in accordance with which the users interact with the application) to perform or complete a task, a job or an action when the users interact with the application.

In another embodiment, the recommender module 285 can suggest modifications to any combination of features of the application including whether an existing feature should be modified or removed, and whether a new feature should be added. A few non-limiting examples of features of an application include user interface elements such as input controls (e.g., buttons, text fields, checkboxes, radio buttons, dropdown lists, list boxes, toggles, date field); navigational components (e.g., breadcrumb, slider, search field, pagination, tags, icons); informational components (e.g., tooltips, icons, progress bar, notifications, message boxes, modal windows); containers (e.g., accordion); assets, etc. The features of an application will now be described in greater detail below.

As used herein some common definitions of containers can include one or more of: windows (e.g., a graphical control element consisting of a visual area containing some of the graphical user interface elements of the program it belongs to); collapsible panels (e.g., a panel that can compactly store content which is hidden or revealed by clicking the tab of the widget). Accordions (e.g., a vertically stacked list of items, such as labels or thumbnails where each item can be "expanded" to reveal the associated content) modal windows (e.g., a graphical control element subordinate to an application's main window which creates a mode where the main window can't be used); dialog boxes (e.g., a small window that communicates information to the user and prompts for a response); palette windows (e.g., also known as "Utility window"—a graphical control element which floats on top of all regular windows and offers ready access tools, commands or information for the current application); inspector windows (e.g., a type of dialog window that shows a list of the current attributes of a selected object and allows these parameters to be changed on the fly); frames (e.g., a type of box within which a collection of graphical control elements can be grouped as a way to show relationships visually); canvases (e.g., generic drawing element for representing graphical information); cover flows (e.g., an animated, three-dimensional element to visually flipping through snapshots of documents, website bookmarks, album artwork, or photographs); bubble flows (e.g., an animated, two-dimensional element that allows users to browse and interact the entire tree view of a discussion thread.

As used herein, the term "asset" can refer to a resource or components that developers need in order to implement an artifact used in a UI and UX. A few non-limiting examples of UI design assets are color, palettes (codes), styles, icons, fonts, images, animation, audio, video and each and every other element that is used in visual design techniques.

Many of the features of an application that are described herein can be presented to users via Graphical User Interfaces (GUI) 217 that is part of the application. Graphical user interfaces (GUIs) 217 use visual conventions to represent the generic information shown. Some conventions are used to build the structure of the static elements on which the user can interact, and define the appearance of the interface can include windows (e.g., an area on the screen that displays information, with its contents being displayed independently from the rest of the screen). A window can be placed in front or behind another window, its size can be adjusted, and scrollbars can be used to navigate the sections within it. Multiple windows can also be open at one time, in which case each window can display a different application or file (e.g., this is very useful when working in a multitasking environment. The system memory is the only limitation to the number of windows that can be open at once. There are also many types of specialized windows.) A container window is a window that is opened while invoking the icon of a mass storage device, or directory or folder and which is presenting an ordered list of other icons that could be again some other directories, or data files or maybe even executable programs. All modern container windows could present their content on-screen either acting as browser windows or text windows. Their behavior can automatically change according to the choices of the single users and their preferred approach to the graphical user interface. A browser window allows the user to move forward and backward through a sequence of documents or web pages. Web browsers are an example of these types of windows. Text terminal windows are designed for embedding interaction with text user interfaces within the overall graphical interface. MS-DOS and UNIX consoles are examples of these types of windows. A child window opens automatically or as a result of user activity in a parent window. Pop-up windows on the Internet can be child windows. A message window, or dialog box, is a type of child window. These are usually small and basic windows that are opened by a program to display information to the user and/or get information from the user. They usually have a button that must be pushed before the program can be resumed.

Menus allow the user to execute commands by selecting from a list of choices. Options are selected within a GUI using a mouse, a pointing device, a keyboard, etc. Menus are convenient because they show what commands are available within the software. This limits the amount of documentation the user reads to understand the software. A menu bar can be displayed horizontally across the top of the screen and/or along the tops of some or all windows. A pull-down menu can be commonly associated with this menu type. When a user clicks on a menu option the pull-down menu will appear. A menu has a visible title within the menu bar. Its contents are only revealed when the user selects it with a pointer. The user is then able to select the items within the pull-down menu. When the user clicks elsewhere the content of the menu will disappear. A context menu is invisible until the user performs a specific mouse action, like pressing the right mouse button. When the software-specific mouse action occurs the menu will appear under the cursor. Menu extras are individual items within or at the side of a menu.

Referring again to FIG. 2, the recommender module 285 can suggest, for example, modifications to features of the application such as whether an input control of the application should be presented within the application, or an order in which that input control of the application is presented to a user of the application. The recommender module 285 can also suggest, for example, modifications to features of the application such as whether a navigational component of the application is presented within the application or an order in which that navigational component of the application is presented to a user of the application. The recommender module 285 can also suggest, for example, modifications to features of the application such as whether an informational component of the application is presented within the application, or an order in which that informational component of the application is presented to a user of the application. The recommender module 285 can also suggest, for example, modifications to features of the application such as whether a container of the application is presented within the application or an order in which that container of the application is presented to a user of the application. A container can be, for instance, an accordion, which is a vertically stacked list of items that utilize show/hide functionality. When a label is clicked, it expands the section showing the content within. There can have one or more items showing at a time and may have default states that reveal one or more sections without the user clicking. The recommender module 285 can also suggest, for example, modifications to features of the application such as whether a page of the application is presented within the application or an order in which that page of the application is presented to a user of the application. A page can refer to a particular instance that is displayed via a GUI on a display screen of a computer display. Types of pages can include account pages, case pages, contact pages, custom pages, event pages, feed pages, group pages, lead pages, list view pages, opportunity pages, people pages, person account pages, related list pages, search results pages, task pages, etc. Each page can include various action buttons.

Figure 3:
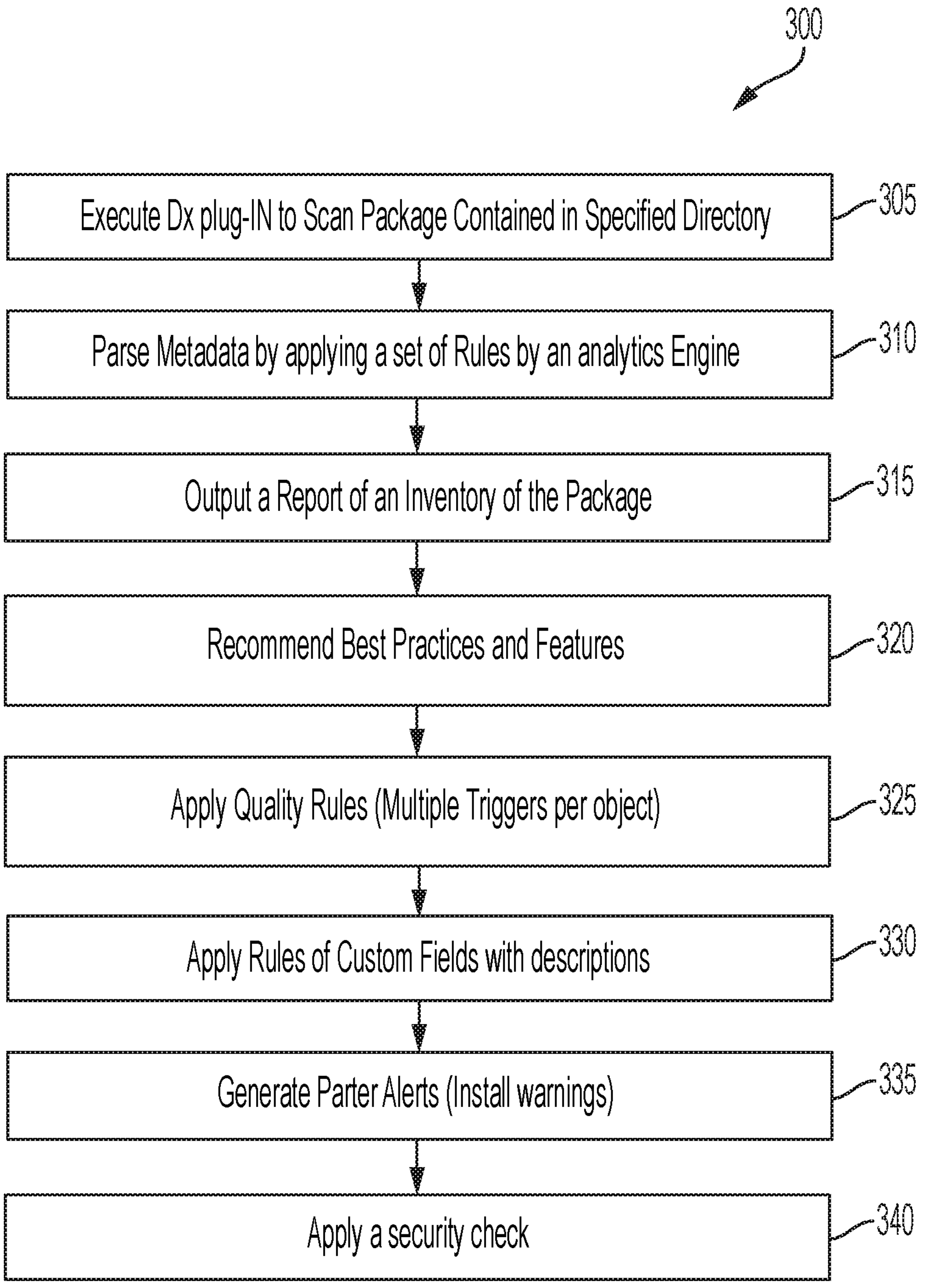
FIG. 3 is a flowchart diagram of an example of a method executing the DX plug-in in which features of the disclosed embodiments can be implemented in accordance with the disclosed embodiments.

FIG. 3 is a flowchart diagram of an example of a method 300 executing the DX plug-in in which features of the disclosed embodiments can be implemented in accordance with the disclosed embodiments. In FIG. 3, the method 300 at step 305, the DX plug-in is initially executed by the developer or user to scan a package in a specified directory. In addition, the scanning can also provide an inventory of monitored metadata items and enablement messages. The scan can be performed for a comprehensive listing of the package and provide a complete inventory of the package metadata. That is, at step 310, the metadata is parsed and a set of rules is applied to create the inventory listing. For example, the rules can include not to display alerts and warnings, or display particular "help" messages. Also, the rules can be applied such as items that are checked are to be displayed or displaying the edition warning that should be checked. In step 315, an output of the inventory listing of items can be generated that includes the metadata type and the count. At step 320, recommendations and best practices can be generated. For example, in a package flow to consider using flow templates to allow subscribers to modify the flow as needed. Other recommendations can include: being aware of limits on custom fields on activity, best practices for Batch Apex design patterns, and information about migration tools for components on different application platforms. At 325, quality rules can be implemented such as using objects with multiple triggers. At step 330, other quality rules can be implemented such as it is best practice that custom objects have descriptions, custom fields should have descriptions. At step 335, partner alerts to signed up partners can be sent, which can include installation warnings, compatibility warnings, etc. At step 340, a security health check can be performed that includes configuring permission requirements to access various APEX classes.

FIGS. 4-10 are outputs of methods 100 and 300 by the DX plug-in for providing recommendations to modify an application provided by a cloud-based computing system in accordance with the disclosed embodiments. It should be understood that steps of the methods 100, and 300 are not necessarily limiting and that steps can be added, omitted, and/or performed simultaneously without departing from the scope of the appended claims. It should be appreciated that the methods 100 and 300, may include any number of additional or alternative tasks, that the outputs shown in FIGS. 4-10 can include variations not shown which can result from different packages and more comprehensive procedure or process having additional functionality not described in detail herein. It should also be understood that the illustrated outputs of FIGS. 4-10 are derived from computer-implemented tasks or steps that are performed in connection with the methods 100, and 300, and that they may be performed by software, hardware, firmware, or any combination thereof. In certain embodiments, some or all steps of this process, and/or substantially equivalent steps, are performed by execution of processor-readable instructions stored or included on a processor-readable medium. Depending on the implementation, some of the processing system(s) can be centrally located, or distributed among a number of systems that work together.

FIG. 4 is an output information table of an exemplary sample report 400 of an inventory of package based on the metadata executed by the DX plug-in in the disclosed embodiments that can be implemented in accordance with the disclosed embodiments. The sample report 400 includes descriptions of the metadata 405, a listing of the metadata sets 410 and the number or count 420 associated with each metadata set 410. The DX plugin can be configured to compare alerts against the metadata listed in the inventory (i.e. a complete inventory of the package) to draw the developers' attention to a feature that may or will be required to be modified, or changed to meet the platform requires. The DX plugin compares the alerts against the metadata to show only the relevant metadata sets and changes necessary. In addition, the report FIG. 5 is an output information table of an exemplary sample report 500 of recommendations and best practices for the package based on the metadata executed by the DX plug-in in the disclosed embodiments that can be implemented in accordance with the disclosed embodiments. In FIG. 5, the sample report 500 includes an exemplary set of best practices and recommendations 505 that can be presented by the DX plug-in to the developer. For example, a technical enablement 510 for flow with templates and a link for more information; a batch apex 515 link for more information about batch Apex design patterns; Triggers on expense type 520 with a commentary stating that best practices recommend 1 trigger per object and a link to find more information about the best practices for a trigger per object; Async triggers 530, a link provided to find more information about async triggers; In-app prompts 540 and a link for more information about in-app prompts; fields of activity 550 and a commentary to be aware that there is a hard limit of 100 fields on activities; Aura components 560 and a decision matrix on whether you should be considering migrating to the LWC; and installation warnings 570 and alert that packages cannot be installed on essentials due to the apex count, because of a needed security review, and customer object count.

FIG. 6 is an output information table of an exemplary sample report of enablement conditions for the package based on the metadata executed by the DX plug-in in the disclosed embodiments that can be implemented in accordance with the disclosed embodiments. In FIG. 6, the enablement messages 600 include in row "1" a set of data 610 for each message classified as metadata type, condition, enablement message, status, and notes. In row "2", a set of data 620 of flow without templates, condition of "not found", link for more information, and a status "complete". In row "3", a set of data 630 of flow templates, condition of "not found", link for more information, and a status "complete". In row "4", a set of data 630 includes classes and a not applicable condition. In row "5", a set of data 650 includes Batch Apex, condition "found" and link for more information about Batch Apex design patterns. In row "6", a set of data 660 includes triggers, condition which is not applicable, and commentary of best practices with a link for more information. In row "7", a set of data 670 includes Async triggers and a link for more information about Async triggers. In row "8", a set of data 680 includes visual force pages and a condition that is not applicable. The enablement messages 600 can be configured as desired for requirements of the package. Further, historic message information can also be used from the local, server and multi-tenant connected database on the platform.

FIG. 7 is an output information table of an exemplary sample report 700 of installation warnings for the package based on the metadata executed by the DX plug-in in the disclosed embodiments that can be implemented in accordance with the disclosed embodiments. The sample report 700 is configured to include installation warnings for an application set contained in the package that is classified in columns 710 by application type and features necessary for implementing the application features that include application essentials, groups implementing the applications, professional editions of the application, and enterprise editions of the application. The output sample report 700 classifies a set of rows 720 with respect to each column 710 as record types, person accounts, Apex Web services, custom profiles, custom fields on activity, and report types.

FIG. 8 is an output information list of an exemplary sample report 800 of edition warnings for the package based on the metadata executed by the DX plug-in in the disclosed embodiments that can be implemented in accordance with the disclosed embodiments. The sample report 800 includes classifications of edition 810, item 815 and threshold 820 for the respective categories of essentials 825, group edition 830, professional edition 840 and enterprise edition 850. For example, the essentials 825 for an application or package include items 815 of record types, person accounts, classes, platform events, custom profiles, sharing rules, custom fields on activity, custom metadata, Apex, scheduled Apex, and custom objects in which each is associated with a threshold 820. Likewise the group edition 830, the professional edition 840, and the enterprise edition 850 all include various associated items 815.

FIG. 9 is an output information list of an exemplary sample report 900 of enablement rules 910 for the package based on the metadata executed by the DX plug-in in the disclosed embodiments that can be implemented in accordance with the disclosed embodiments. The sample report includes a set of rules 920, thresholds 930 associated with each rule in the set of rules, and messages 940.

Figure 10:
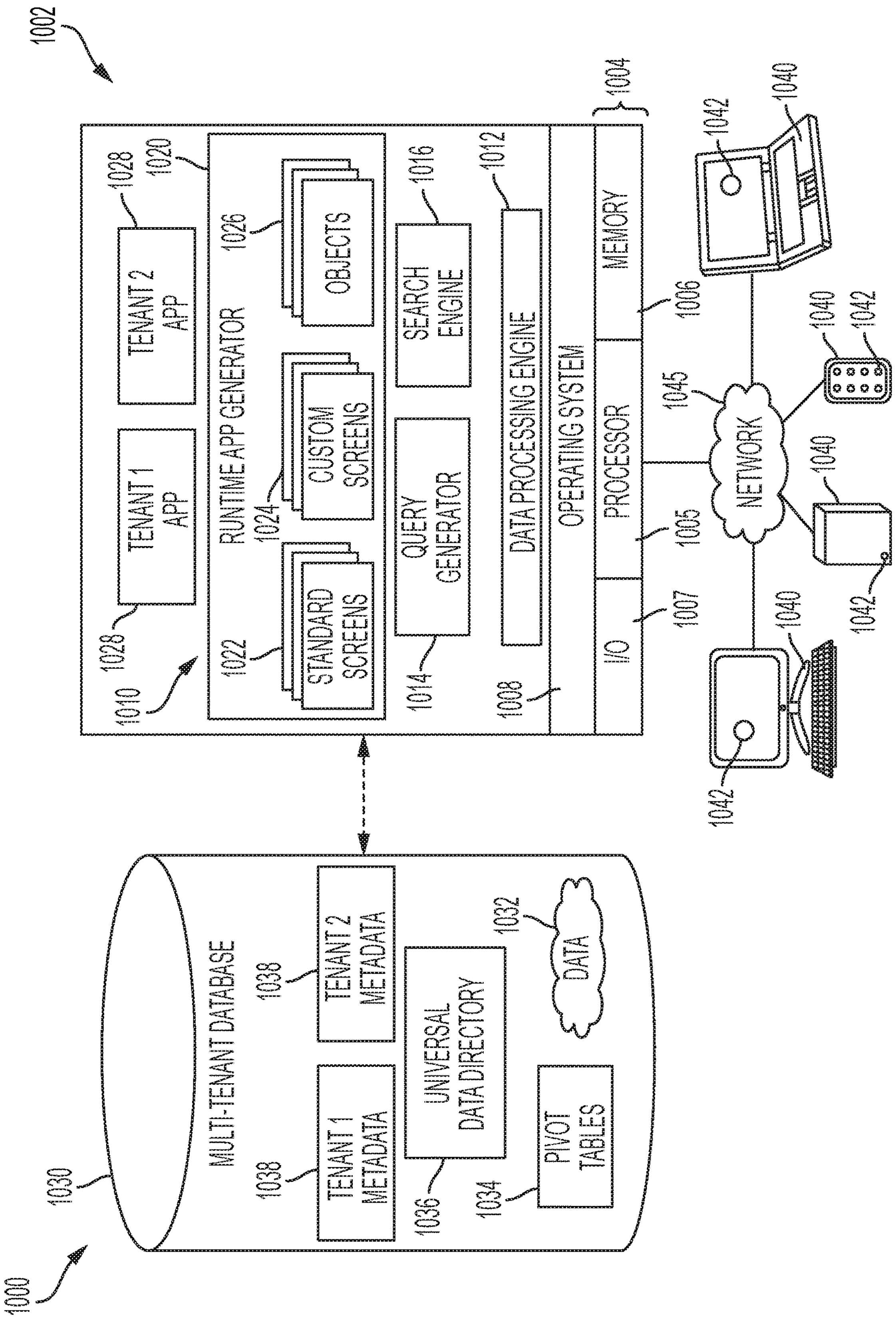
FIG. 10 is a schematic block diagram of an example of a multi-tenant computing environment in which features of the disclosed embodiments can be implemented in accordance with the disclosed embodiments.

FIG. 10 is a schematic block diagram of an example of a multi-tenant computing environment in which features of the disclosed embodiments can be implemented in accordance with the disclosed embodiments. As shown in FIG. 10, an exemplary cloud-based solution may be implemented in the context of a multi-tenant system 1000 including a server 1002 that supports applications 1028 based upon data 1032 from a database 1030 that may be shared between multiple tenants, organizations, or enterprises, referred to herein as a multi-tenant database. The multi-tenant system 1000 can be shared by many different organizations and handles the storage of, and access to, different metadata, objects, data and applications across disparate organizations. In one embodiment, the multi-tenant system 1000 can be part of a database system, such as a multi-tenant database system.

The multi-tenant system 1000 can provide applications and services and store data for any number of organizations. Each organization is a source of metadata and data associated with that metadata that collectively make up an application. In one implementation, the metadata can include customized content of the organization (e.g., customizations done to an instance that defines business logic and processes for an organization). Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, automation rules and processes, etc. Data is associated with metadata to create an application. Data can be stored as one or more objects, where each object holds particular records for an organization. As such, data can include records (or user content) that are held by one or more objects.

The multi-tenant system 1000 allows users of user systems 1040 to establish a communicative connection to the multi-tenant system 1000 over a network 1045 such as the Internet or any type of network described herein. Based on a user's interaction with a user system 1040, the application platform 1010 accesses an organization's data (e.g., records held by an object) and metadata that is stored at one or more database systems 1030, and provides the user system 1040 with access to applications based on that data and metadata. These applications are executed or run in a process space of the application platform 1010 will be described in greater detail below. The user system 1040 and various other user systems (not illustrated) can interact with the applications provided by the multi-tenant system 1000. The multi-tenant system 1000 is configured to handle requests for any user associated with any organization that is a tenant of the system. Data and services generated by the various applications 1028 are provided via a network 1045 to any number of user systems 1040, such as desktops, laptops, tablets, smartphones or other client devices, Google Glass™, and any other computing device implemented in an automobile, aircraft, television, or other business or consumer electronic device or system, including web clients.

Each application 1028 is suitably generated at run-time (or on-demand) using a common application platform 1010 that securely provides access to the data 1032 in the database 1030 for each of the various tenant organizations subscribing to the system 1000. The application platform 1010 has access to one or more database systems 1030 that store information (e.g., data and metadata) for a number of different organizations including user information, organization information, custom information, etc. The database systems 1030 can include a multi-tenant database system 1030 as described with reference to FIG. 10, as well as other databases or sources of information that are external to the multi-tenant database system 1030 of FIG. 10. In accordance with one non-limiting example, the service cloud 1000 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that share access to a common subset of the data within the multi-tenant database 1030. In this regard, each tenant includes one or more users and/or groups associated with, authorized by, or otherwise belonging to that respective tenant. Stated another way, each respective user within the multi-tenant system 1000 is associated with, assigned to, or otherwise belongs to a particular one of the plurality of enterprises supported by the system 1000.

Each enterprise tenant may represent a company, corporate department, business or legal organization, and/or any other entities that maintain data for particular sets of users (such as their respective employees or customers) within the multi-tenant system 1000. Although multiple tenants may share access to the server 1002 and the database 1030, the particular data and services provided from the server 1002 to each tenant can be securely isolated from those provided to other tenants. The multi-tenant architecture, therefore, allows different sets of users to share functionality and hardware resources without necessarily sharing any of the data 1032 belonging to or otherwise associated with other organizations.

The multi-tenant database 1030 may be a repository or other data storage system capable of storing and managing the data 1032 associated with any number of tenant organizations. The database 1030 may be implemented using conventional database server hardware. In various embodiments, the database 1030 shares processing hardware 1004 with the server 1002. In other embodiments, the database 1030 is implemented using separate physical and/or virtual database server hardware that communicates with the server 1002 to perform the various functions described herein.

In an exemplary embodiment, the database 1030 includes a database management system or other equivalent software capable of determining an optimal query plan for retrieving and providing a particular subset of the data 1032 to an instance of application (or virtual application) 1028 in response to a query initiated or otherwise provided by an application 1028, as described in greater detail below. The multi-tenant database 1030 may alternatively be referred to herein as an on-demand database, in that the database 1030 provides (or is available to provide) data at run-time to on-demand virtual applications 1028 generated by the application platform 1010, as described in greater detail below.

In practice, the data 1032 may be organized and formatted in any manner to support the application platform 1010. In various embodiments, the data 1032 is suitably organized into a relatively small number of large data tables to maintain a semi-amorphous "heap"-type format. The data 1032 can then be organized as needed for a particular virtual application in 1028. In various embodiments, conventional data relationships are established using any number of pivot tables 1034 that establish indexing, uniqueness, relationships between entities, and/or other aspects of conventional database organization as desired. Further data manipulation and report formatting are generally performed at run-time using a variety of metadata constructs. Metadata within a universal data directory (UDD) 1036, for example, can be used to describe any number of forms, reports, workflows, user access privileges, business logic and other constructs that are common to multiple tenants.

Tenant-specific formatting, functions and other constructs may be maintained as tenant-specific metadata 1038 for each tenant, as desired. Rather than forcing the data 1032 into an inflexible global structure that is common to all tenants and applications, the database 1030 is organized to be relatively amorphous, with the pivot tables 1034 and the metadata 1038 providing additional structure on an as-needed basis. To that end, the application platform 1010 suitably uses the pivot tables 1034 and/or the metadata 1038 to generate "virtual" components of the virtual applications 1028 to logically obtain, process, and present the relatively amorphous data 1032 from the database 1030.

The server 1002 may be implemented using one or more actual and/or virtual computing systems that collectively provide the dynamic application platform 1010 for generating the virtual applications 1028. For example, the server 1002 may be implemented using a cluster of actual and/or virtual servers operating in conjunction with each other, typically in association with conventional network communications, cluster management, load balancing and other features as appropriate. The server 1002 operates with any sort of conventional processing hardware 1004, such as a processor 1005, memory 1006, input/output features 1007 and the like. The input/output features 1007 generally represent the interface(s) to networks (e.g., to the network 1045, or any other local area, wide area or other networks), mass storage, display devices, data entry devices and/or the like.

The processor 1005 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 1006 represents any non-transitory short or long term storage or other computer-readable media capable of storing programming instructions for execution on the processor 1005, including any sort of random access memory (RAM), read-only memory (ROM), flash memory, magnetic or optical mass storage, and/or the like. The computer-executable programming instructions, when read and executed by the server 1002 and/or processor 1005, cause the server 1002 and/or processor 1005 to create, generate, or otherwise facilitate the application platform 1010 and/or virtual applications 1028 and perform one or more additional tasks, operations, functions, and/or processes described herein. It should be noted that the memory 1006 represents one suitable implementation of such computer-readable media, and alternatively or additionally, the server 1002 could receive and cooperate with external computer-readable media that is realized as a portable or mobile component or platform, e.g., a portable hard drive, a USB flash drive, an optical disc, or the like.

The server 1002, application platform 1010 and database systems 1030 can be part of one backend system. Although not illustrated, the multi-tenant system 1000 can include other backend systems that can include one or more servers that work in conjunction with one or more databases and/or data processing components, and the application platform 1010 can access the other backend systems.

The multi-tenant system 1000 includes one or more user systems 1040 that can access various applications provided by the application platform 1010. The application platform 1010 is a cloud-based user interface. The application platform 1010 can be any sort of software application or other data processing engine that generates the virtual applications 1028 that provide data and/or services to the user systems 1040. In a typical embodiment, the application platform 1010 gains access to processing resources, communications interfaces and other features of the processing hardware 1004 using any sort of conventional or proprietary operating system 1008. The virtual applications 1028 are typically generated at run-time in response to input received from the user systems 1040. For the illustrated embodiment, the application platform 1010 includes a bulk data processing engine 1012, a query generator 1014, a search engine 1016 that provides text indexing and other search functionality, and a runtime application generator 1020. Each of these features may be implemented as a separate process or other modules, and many equivalent embodiments could include different and/or additional features, components or other modules as desired.

The runtime application generator 1020 dynamically builds and executes the virtual applications 1028 in response to specific requests received from the user systems 1040. The virtual applications 1028 are typically constructed in accordance with the tenant-specific metadata 1038, which describes the particular tables, reports, interfaces and/or other features of the particular application 1028. In various embodiments, each virtual application 1028 generates dynamic web content that can be served to a browser or other client program 1042 associated with its user system 1040, as appropriate.

The runtime application generator 1020 suitably interacts with the query generator 1014 to efficiently obtain multi-tenant data 1032 from the database 1030 as needed in response to input queries initiated or otherwise provided by users of the user systems 1040. In a typical embodiment, the query generator 1014 considers the identity of the user requesting a particular function (along with the user's associated tenant), and then builds and executes queries to the database 1030 using system-wide metadata 1036, tenant-specific metadata 1038, pivot tables 1034, and/or any other available resources. The query generator 1014 in this example, therefore, maintains security of the common database 1030 by ensuring that queries are consistent with access privileges granted to the user and/or tenant that initiated the request.

With continued reference to FIG. 10, the data processing engine 1012 performs bulk processing operations on the data 1032 such as uploads or downloads, updates, online transaction processing, and/or the like. In many embodiments, less urgent bulk processing of the data 1032 can be scheduled to occur as processing resources become available, thereby giving priority to more urgent data processing by the query generator 1014, the search engine 1016, the virtual applications 1028, etc.

In exemplary embodiments, the application platform 1010 is utilized to create and/or generate data-driven virtual applications 1028 for the tenants that they support. Such virtual applications 1028 may make use of interface features such as custom (or tenant-specific) screens 1024, standard (or universal) screens 1022 or the like. Any number of custom and/or standard objects 1026 may also be available for integration into tenant-developed virtual applications 1028. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 1032 associated with each virtual application 1028 is provided to the database 1030, as appropriate, and stored until it is requested or is otherwise needed, along with the metadata 1038 that describes the particular features (e.g., reports, tables, functions, objects, fields, formulas, code, etc.) of that particular virtual application 1028. For example, a virtual application 1028 may include a number of objects 1026 accessible to a tenant, wherein for each object 1026 accessible to the tenant, information pertaining to its object type along with values for various fields associated with that respective object type are maintained as metadata 1038 in the database 1030. In this regard, the object type defines the structure (e.g., the formatting, functions and other constructs) of each respective object 1026 and the various fields associated therewith.

Still referring to FIG. 10, the data and services provided by the server 1002 can be retrieved using any sort of personal computer, mobile telephone, tablet or other network-enabled user systems 1040 on the network 1045. In an exemplary embodiment, the user system 1040 includes a display device, such as a monitor, screen, or another conventional electronic display capable of graphically presenting data and/or information retrieved from the multi-tenant database 1030, as described in greater detail below.

Typically, the user operates a conventional browser application or other client programs 1042 executed by the user system 1040 to contact the server 1002 via the network 1045 using a networking protocol, such as the hypertext transport protocol (HTTP) or the like. The user typically authenticates his or her identity to the server 1002 to obtain a session identifier ("SessionID") that identifies the user in subsequent communications with the server 1002. When the identified user requests access to a virtual application 1028, the runtime application generator 1020 suitably creates the application at run time based upon the metadata 1038, as appropriate. However, if a user chooses to manually upload an updated file (through either the web-based user interface or through an API), it will also be shared automatically with all of the users/devices that are designated for sharing.

As noted above, the virtual application 1028 may contain Java, ActiveX, or other content that can be presented using conventional client software running on the user system 1040; other embodiments may simply provide dynamic web or other content that can be presented and viewed by the user, as desired. As described in greater detail below, the query generator 1014 suitably obtains the requested subsets of data 1032 from the database 1030 as needed to populate the tables, reports or other features of the particular virtual application 1028.

In various exemplary embodiments, a method is provided enablement information related to a software package in application development by implementing a plug-in application interacting with a cloud-based computing system for use by a user of an organization that is connected to the cloud-based computing server. The methods provided can include executing, by the user, the plug-in application in a course of application development of the software package on the cloud-based server; parsing, by the plug-in application, a set of applications contained in the software package during the application development on the cloud-based server to generate at least one set of metadata data wherein at least one set of metadata comprises an entire set of metadata for the software package; receiving, by the plug-in application, a set of rules via the cloud-based computing system; defining, by the plug-in application, a set of definitions for each rule to enable a comparison of each rule to the set of metadata to extract one or more features of each application contained in the software package; generating, by the plug-in application, an inventory set of features based on rule definitions for the software package; and generating, by the plug-in application, at least one recommendation related to a particular feature of the inventory set of features in each application of the software package.

In various exemplary embodiments, the method provided includes: generating, by the plug-in application, at least one alert related the particular feature of the inventory set of features in each application contained in the software package; generating, by the plug-in application, at least one alert related to an enablement of the software package based on an application of one or more definitions of the set of rules; generating, by the plug-in application, the at least one alert based on the enablement of the software package based on an edition of the software package implemented on the cloud-based computing system. The at least one recommendation suggests modifications to at least one feature of the application:

that determines whether an input control of the application is presented within each application or an order in which that input control of the application is presented within each application contained in the software package. The recommendation suggests modifications to at least one feature of the application wherein the modification comprising use of a single trigger or multiple sets of triggers associated with an object contained in the application of the software package. The recommendation suggests modifications to an existing process within the application that can result in a new process to improve a process within the application contained in the software package. The recommendation suggests modifications to at least one feature of the application: that determines whether a graphic user component of the application is presented within the application, or an order in which that the graphic user component of the application is presented to the user of the application. The recommendation suggests modifications to at least one feature of the application: that determines whether an information component is related to the software package wherein the information component comprises a link of content related to a particular feature of an application contained in the software package, and presents that information component as a link to the user for accessing the content. The recommendation suggests whether the application of the software package is compatible with one or more system requirements found on a user's device in the course of application development by the user.

The following description is one example of a system in which the features described above may be implemented. The components of the system described below are merely one example and should not be construed as limiting. The features described above with respect to FIGS. 1-10 may be implemented in any other type of computing environment, such as one with multiple servers, one with a single server, a multi-tenant server environment, a single-tenant server environment, or some combination of the above.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for providing enablement information related to a software package in application development by implementing a plug-in application, the method comprising:

executing the plug-in application in a course of application development of the software package connected to a cloud-based computing system;

parsing, by the plug-in application, a set of applications contained in the software package during the application development on a cloud-based server to generate a set of metadata data that comprises an entire set of metadata for the software package;

receiving, by the plug-in application, a set of rules via the cloud-based computing system;

defining, by the plug-in application, a set of definitions for each rule in the set of rules to enable a comparison of each rule to the set of metadata to extract one or more features of each application contained in the software package;

generating, by the plug-in application, an inventory set of one or more features based on rule definitions for the software package; and generating, by the plug-in application, a recommendation related to a feature of the inventory set of one or more features in each application of the software package.

2. The method of claim 1, further comprising:

generating, by the plug-in application, an alert related to the feature of the inventory set of one or more features in each application contained in the software package.

3. The method of claim 2, further comprising:

generating, by the plug-in application, an alert related to enablement of the software package based on an application of one or more definitions of the set of rules.

4. The method of claim 2, further comprising:

generating, by the plug-in application, the alert based on enablement of the software package based on an edition of the software package implemented on the cloud-based computing system.

5. The method of claim 1, wherein the recommendation suggests modifications to the feature of the application:

that determines a health or security check of the application is presented within each application contained in the software package.

6. The method of claim 1, wherein the recommendation suggests a modification to the feature of the application wherein the modification comprising use of a single trigger or a multiple sets of triggers associated with an object contained in the application of the software package.

7. The method of claim 1, wherein the recommendation suggests modifications to an existing process within the application that can result in a new process to improve a process within the application contained in the software package.

8. The method of claim 1, wherein the recommendation suggests modifications to the feature of the application:

that determines whether a graphic user component of the application is presented within the application, or an order in which that the graphic user component of the application is presented.

9. The method of claim 1, wherein the recommendation suggests modifications to the feature of the application:

that determines whether an information component is related to the software package wherein the information component comprises a link of content related to a particular feature of an application contained in the software package; and that presents information component as a link to the user for accessing the content.

10. The method of claim 1, wherein the recommendation suggests whether the application of the software package is compatible with one or more system requirements found on a user's device in the course of application development.

11. A cloud-based computing system that hosts a plurality of organizations, comprising:

an organization connected to the cloud-based computing system comprising a software package in application development; and a plug-in application that when executed by a hardware-based processing system is configurable to cause:

parsing a set of applications contained in the software package during the application development on a cloud-based server to generate a set of metadata data that comprises an entire set of metadata for the software package;

receiving a set of rules via the cloud-based computing system;

defining a set of definitions for each rule to enable a comparison of each rule to the set of metadata to extract one or more features of each application contained in the software package;

generating an inventory set of one or more features based on rule definitions for the software package; and generating a recommendation related to a feature of the inventory set of one or more features in each application of the software package.

12. The cloud-based computing system according to claim 11, further comprising:

an alert generated by the plug-in application related to a cloud-based computing system feature of the inventory set of one or more features in each application contained in the software package.

13. The cloud-based computing system according to claim 12, further comprising:

an alert generated related to enablement of the software package based on an application of one or more definitions of the set of rules.

14. The cloud-based computing system according to claim 11, wherein the recommendation suggests modifications to the feature of the application:

that determines a health check of the application of each application presented within the software package contained in the software package.

15. The cloud-based computing system according to claim 11, wherein recommendation suggests modifications to the feature of the application:

that determines whether an input control of the application of each application is presented within the software package, or an order in which that input control of the application is presented within each application contained in the software package.

16. The cloud-based computing system according to claim 11, wherein the recommendation suggests modifications to an existing process workflow by which the user interacts with the application to result in a new process workflow with the application to reduce a number of steps required to perform or complete a task, a job or an action with the application.

17. The cloud-based computing system according to claim 11, wherein the recommendation suggests modifications to the feature of the application:

that determines whether a graphic user component of the application is presented within the application, or an order in which that the graphic user component of the application is presented.

18. The cloud-based computing system according to claim 11, wherein the recommendation suggests whether the application of the software package is compatible with one or more system requirements found on a user's device in the course of application development.

19. A system comprising a hardware-based processor and memory, wherein the memory comprises processor-executable instructions encoded on a non-transient processor-readable media, wherein the processor-executable instructions are configurable to be executed by the processor to perform a method comprising the steps of:

executing a plug-in application in a course of application development of the software package connected to a cloud-based computing system;

parsing a set of applications contained in the software package during the application development with the connected cloud-based computing system to generate a set of metadata data wherein that comprises an entire set of metadata for the software package;

receiving a set of rules via the cloud-based computing system;

defining a set of definitions for each rule to enable a comparison of each rule to the set of metadata to extract one or more features of each application contained in the software package;

generating an inventory set of one or more features of each application based on rule definitions for the software package; and generating a recommendation related to a particular feature of the inventory set of one or more features in each application of the software package.

20. The system according to claim 19, wherein the recommendation suggests whether the application of the software package is compatible with one or more system requirements found on a user's device in the course of application development.

* * * * *